(12) United States Patent
Grundhoefer et al.

(10) Patent No.: US 11,892,632 B2
(45) Date of Patent: Feb. 6, 2024

(54) MODIFYING DISPLAY OPERATING PARAMETERS BASED ON LIGHT SUPERPOSITION FROM A PHYSICAL ENVIRONMENT

(71) Applicant: Apple Inc., Cupertino, CA (US)

(72) Inventors: Anselm Grundhoefer, Campbell, CA (US); Michael J. Rockwell, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 173 days.

(21) Appl. No.: 17/028,043

(22) Filed: Sep. 22, 2020

(65) Prior Publication Data

US 2021/0157143 A1    May 27, 2021

Related U.S. Application Data

(60) Provisional application No. 62/939,815, filed on Nov. 25, 2019.

(51) Int. Cl.
*G02B 27/01*    (2006.01)
*G06F 3/14*    (2006.01)

(52) U.S. Cl.
CPC ....... *G02B 27/0172* (2013.01); *G06F 3/1407* (2013.01); *G02B 2027/014* (2013.01); *G02B 2027/0112* (2013.01)

(58) Field of Classification Search
CPC ........ G02B 27/0172; G02B 2027/0112; G02B 2027/014; G06F 3/1407; G09G 2320/06;
(Continued)

(56) References Cited

U.S. PATENT DOCUMENTS 9,904,058 B2    2/2018  Yeoh et al.
10,345,151 B1 *  7/2019  Sarkar ..................... G01J 3/524
(Continued)

FOREIGN PATENT DOCUMENTS

GB       2416029 A  *  1/2006  ............ G01J 1/4204
KR    20160055534 A     5/2016
(Continued)

OTHER PUBLICATIONS

Office Action for corresponding Korean Appl. No. 10-2020-0126028 dated Dec. 23, 2021.
(Continued)

*Primary Examiner* — Ryan R Yang
(74) *Attorney, Agent, or Firm* — Fernando & Partners, LLP

(57) ABSTRACT

A method includes sensing a plurality of light superposition characteristic values associated with ambient light from a physical environment. The ambient light emanates from the physical environment towards one side of a translucent display. The plurality of light superposition characteristic values quantifies interactions with the ambient light. The method includes determining a plurality of display correction values associated with the electronic device based on a function of the plurality of light superposition characteristic values and predetermined display characteristics of a computer-generated reality (CGR) object. The method includes changing one or more display operating parameters associated with the electronic device in accordance with the plurality of display correction values in order to satisfy the predetermined display characteristics of the CGR object within a performance threshold.

29 Claims, 16 Drawing Sheets

(58) Field of Classification Search
CPC ......... G09G 2320/066; G09G 2340/12; G09G 2360/144
See application file for complete search history.

(56) References Cited

U.S. PATENT DOCUMENTS

| | | | |
|---|---|---|---|
| 10,643,548 B2* | 5/2020 | Seibert | G09G 3/3406 |
| 10,798,373 B2* | 10/2020 | Speigle | G09G 5/10 |
| 2013/0141434 A1* | 6/2013 | Sugden | G02B 27/0172 |
| | | | 345/426 |
| 2013/0221855 A1* | 8/2013 | Lazaridis | H05B 47/11 |
| | | | 315/149 |
| 2016/0133227 A1* | 5/2016 | Yoon | G09G 3/14 |
| | | | 345/593 |
| 2017/0221450 A1* | 8/2017 | Kim | G09G 5/10 |
| 2017/0343809 A1 | 11/2017 | Benesh et al. | |
| 2020/0128173 A1* | 4/2020 | Lee | H04N 9/646 |
| 2021/0141229 A1* | 5/2021 | Mathur | G02F 1/1368 |
| 2022/0237913 A1* | 7/2022 | Wyble | G06K 9/6265 |

FOREIGN PATENT DOCUMENTS

| | | |
|---|---|---|
| KR | 1020180108041 A | 10/2018 |
| WO | 2020/023266 A1 | 1/2020 |

OTHER PUBLICATIONS

Office Action for corresponding Korean Appl. No. 10-2022-0124355 dated Jan. 27, 2023.

* cited by examiner

MODIFYING DISPLAY OPERATING PARAMETERS BASED ON LIGHT SUPERPOSITION FROM A PHYSICAL ENVIRONMENT

CROSS-REFERENCE TO RELATED APPLICATIONS

This application claims priority to U.S. Provisional Patent App. No. 62/939,815, filed on Nov. 25, 2019, which is hereby incorporated by reference in its entirety.

TECHNICAL FIELD

The present disclosure relates to modifying display operating parameters, and, in particular, modifying the display operating parameters based on light superposition characteristic values associated with ambient light from a physical environment.

BACKGROUND

In augmented reality (AR), computer-generated content is composited with a user's physical environment in order to comingle computer generated visual content with real-world objects. A user may experience AR content by wearing a head-mountable device (HMD) that includes a translucent or transparent display, which, in turn, allows the pass-through of light from the user's physical environment to the user's eyes. The HMD operates as an additive display by adding computer-generated content to the light from the user's physical environment.

In some circumstances, however, light from the physical environment has a color composition and/or brightness that interferes with computer-generated content in a manner that degrades the AR experience. For example, light from the physical environment limits a level of contrast between the physical environment and displayed computer-generated content. As another example, color composition of the physical environment, such as the presence of predominantly one color, may interfere with the color composition of displayed computer-generated content by providing dominant hues that are difficult to mask using additive display methods and hardware.

Some previously available systems include a physical fixed dimming layer that is integrated with a translucent display and the physical environment. Similar to sunglasses, the physical fixed dimming layer functions to block a certain amount light from passing through to the display. However, the display displays a constantly darker version of the user's physical environment, thereby degrading the user's experience and preventing use of such systems in low light situations.

SUMMARY

In accordance with some implementations, a method is performed at an electronic device with one or more processors, a non-transitory memory, and a translucent display. The method includes sensing a plurality of light superposition characteristic values associated with ambient light from a physical environment. The ambient light emanates from the physical environment towards one side of the translucent display. The plurality of light superposition characteristic values quantifies interactions with the ambient light. The method includes determining a plurality of display correction values associated with the electronic device based on a function of the plurality of light superposition characteristic values and predetermined display characteristics of a computer-generated reality (CGR) object. The method includes changing one or more display operating parameters associated with the electronic device in accordance with the plurality of display correction values in order to satisfy the predetermined display characteristics of the CGR object within a performance threshold.

In accordance with some implementations, an electronic device includes one or more processors, a non-transitory memory, and a translucent display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

SUMMARY

Figure 1:
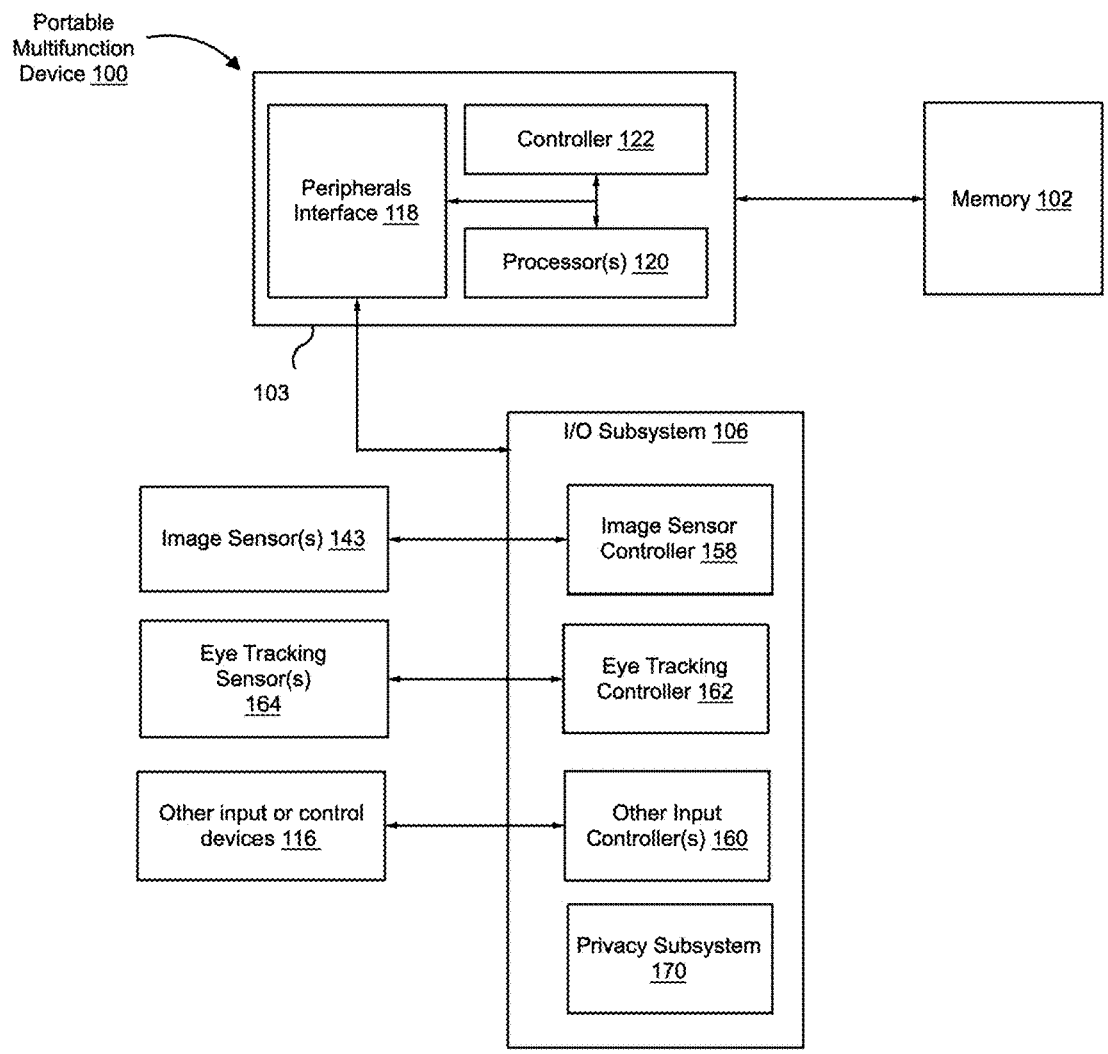
FIG. 1 is a block diagram of an example of a portable multifunction device in accordance with some implementations.

In AR display systems, computer-generated content is composited with a user's physical environment in order to commingle computer-generated visual content with real-world objects. A user may experience AR content by wearing an HMD that includes a translucent display, which, in turn, allows the pass-through of light from the user's physical environment to the user's eyes. The HMD operates as an additive display by projecting AR content to be reflected off of the translucent display to the user's eyes. In some circumstances, however, light from the physical environment has a color composition and/or brightness that interferes with computer-generated content in a manner that degrades the AR experience. For example, light from the physical environment limits a level of contrast between the physical environment and displayed computer-generated content. As another example, color composition of the physical environment, such as the presence of predominantly one color, may interfere with the color composition of displayed computer-generated content by providing dominant hues that are difficult to mask using additive display methods and hardware.

By contrast, various implementations disclosed herein provide methods, electronic devices, and systems that utilize light superposition characteristic values associated with a physical environment in order to change display operating parameters. According to various implementations, an electronic device with a translucent display senses light superposition characteristic values associated with ambient light from a physical environment, such as brightness level, color composition, etc. Based on the light superposition characteristic values and predetermined display characteristics of a CGR object, the electronic device determines display correction values that affect how the CGR object is ultimately rendered and displayed (e.g., added to the additive display). The electronic device changes display operating parameters according to the display correction values. For example, the light superposition characteristic values indicate the presence of a predominately green light emanating from the physical environment, and the electronic device filters out a portion of the green light in order to be able to add a CGR ghost to the display that appears white, without a greenish tint. As another example, the electronic device renders the CGR ghost with a color that is opposite to green (e.g., purple), so that the displayed CGR ghost appears white.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a translucent display through which a person may directly view the physical environment. The system may be configured to present virtual objects on the translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the Sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a translucent display. The translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, image sensor(s) 143 (e.g., a camera), eye tracking sensor(s) 164 (e.g., included within a head-mountable device (HMD)), and other input or control device(s) 116. In some implementations, the electronic device 100 corresponds to one of a mobile phone, tablet, laptop, wearable computing device, head-mountable device (HMD), head-mountable enclosure (e.g. the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more CPUs 120, and the memory controller 122 are, optionally, implemented on a single chip, such as a chip 103. In some other implementations, they are, optionally, implemented on separate chips.

The I/O subsystem 106 couples input/output peripherals on the electronic device 100 and the other input or control devices 116 with the peripherals interface 118. The I/O subsystem 106 optionally includes an image sensor controller 158, an eye tracking controller 162, and one or more input controllers 160 for other input or control devices, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of a speaker and/or audio sensor(s). The one or more buttons optionally include a push button. In some implementations, the other input or control devices 116 includes a positional system (e.g., GPS) that obtains information concerning the location and/or orientation of the electronic device 100 relative to a physical environment.

The I/O subsystem 106 optionally includes a speaker and audio sensor(s) that provide an audio interface between a user and the electronic device 100. Audio circuitry receives audio data from the peripherals interface 118, converts the audio data to an electrical signal, and transmits the electrical signal to the speaker. The speaker converts the electrical signal to human-audible sound waves. Audio circuitry also receives electrical signals converted by an audio sensor (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The I/O subsystem 106 optionally includes a touch-sensitive display system that provides an input interface and an output interface between the electronic device 100 and a user. A display controller may receive and/or send electrical signals from/to the touch-sensitive display system. The touch-sensitive display system displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system has a touch-sensitive surface, sensor, or set of sensors that accepts input from the user based on haptic and/or tactile contact. The touch-sensitive display system and the display controller (along with any associated modules and/or sets of instructions in the memory 102) detect contact (and any movement or breaking of the contact) on the touch-sensitive display system and converts the detected contact into interaction with user-interface objects (e.g., one or more soft keys, icons, web pages or images) that are displayed on the touch-sensitive display system. In an example implementation, a point of contact between the touch-sensitive display system and the user corresponds to a finger of the user or a stylus.

The touch-sensitive display system optionally uses LCD (liquid crystal display) technology, LPD (light emitting polymer display) technology, or LED (light emitting diode) technology, although other display technologies are used in other implementations. The touch-sensitive display system and the display controller optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system.

The user optionally makes contact with the touch-sensitive display system using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The I/O subsystem 106 optionally includes an inertial measurement unit (IMU) that may include accelerometers, gyroscopes, and/or magnetometers in order measure various forces, angular rates, and/or magnetic field information with respect to the electronic device 100. Accordingly, according to various implementations, the IMU detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) 143 corresponds to one or more HMD cameras. In some implementations, the image sensor(s) 143 includes one or more depth sensors. In some implementations, the image sensor(s) 143 includes a combination of a black-and-white (BW) camera and an infrared (IR) camera.

The I/O subsystem 106 optionally includes contact intensity sensors that detect intensity of contacts on the electronic device 100 (e.g., a touch input on a touch-sensitive surface of the electronic device 100). The contact intensity sensors may be coupled with an intensity sensor controller in the I/O subsystem 106. The contact intensity sensor(s) optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) receive contact intensity information (e.g., pressure information or a proxy for pressure information) from the physical environment. In some implementations, at least one contact intensity sensor is collocated with, or proximate to, a touch-sensitive surface of the electronic device 100. In some implementations, at least one contact intensity sensor is located on the back of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2A:
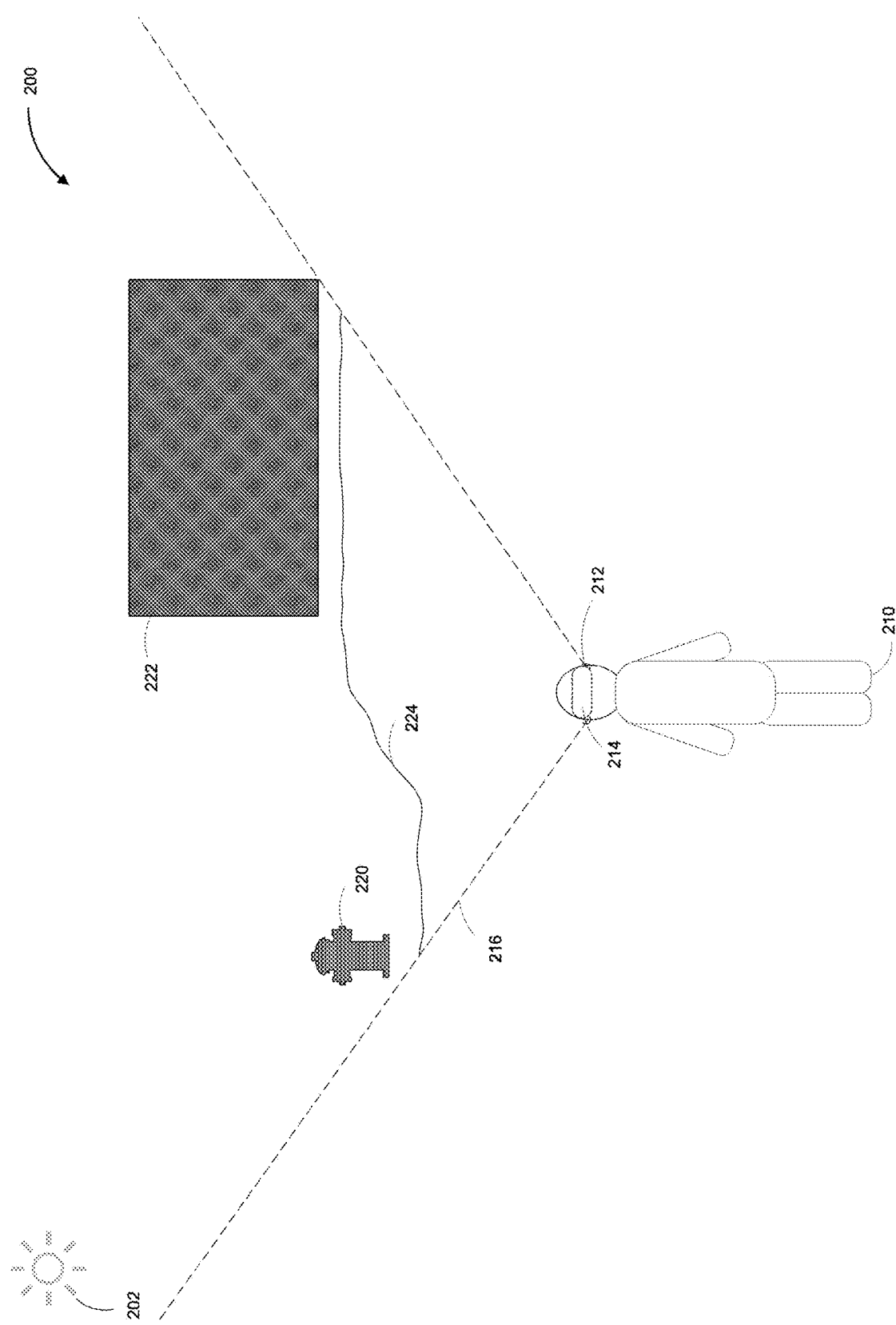
FIGS. 2A-2G are an example of light from a physical environment interfering with display of a CGR object.
Figure 2B:
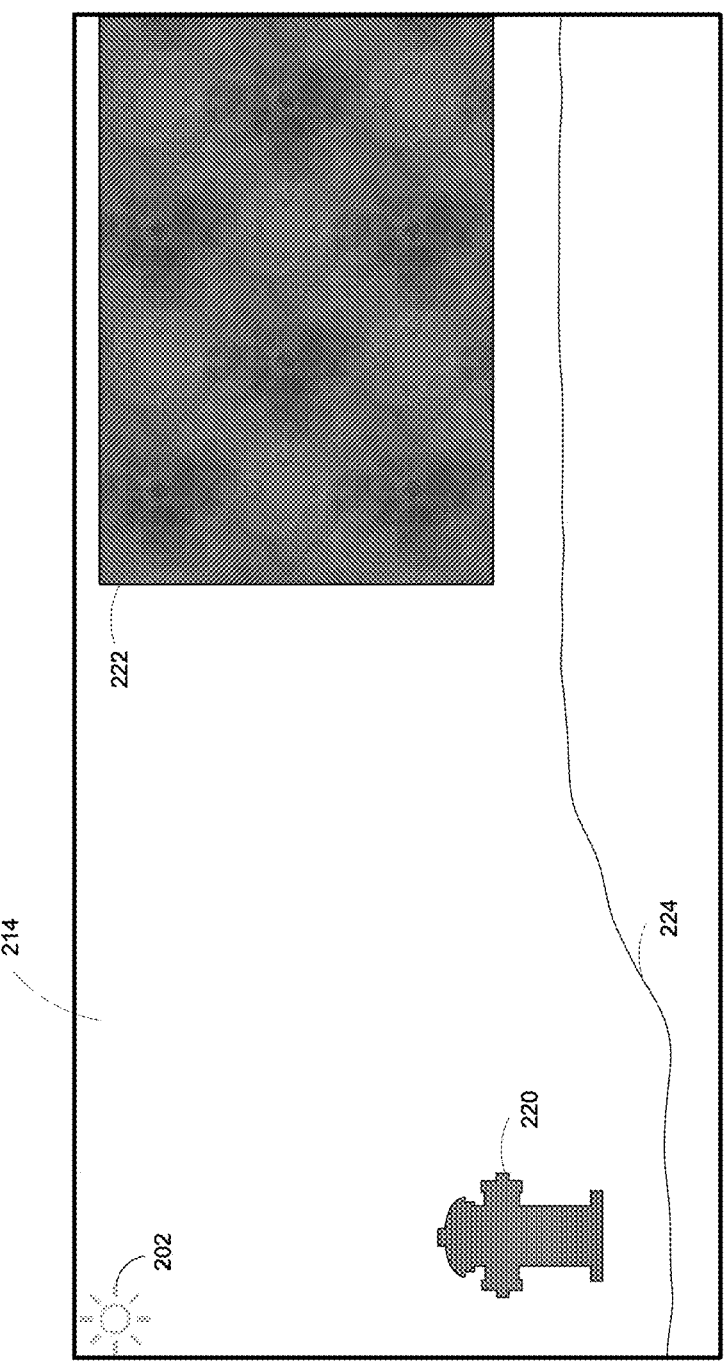

FIGS. 2A-2G are an example of light from a physical environment 200 interfering with display of a CGR object. As illustrated in FIG. 2A, the physical environment 200 includes a user 210 wearing an electronic device 212 (e.g., a head-mountable display (HMD)) that includes a translucent display 214. The translucent display 214 is associated with a field-of-view 216 that includes the Sun 202, a red fire hydrant 220, a blue wall 222, and a path 224. In other words, when the user 210 looks through the translucent display 214, the user 210 sees the Sun 202, the red fire hydrant 220, the blue wall 222, and the path 224. The red fire hydrant 220 and the blue wall 222 include different patterns (e.g., the red fire hydrant 220 includes a horizontal-line pattern whereas the blue wall 222 includes a cross-hatch pattern) in order to indicate that they are different colors. FIG. 2B illustrates the translucent display 214 including the aforementioned physical objects within the physical environment 200.

Figure 2C:
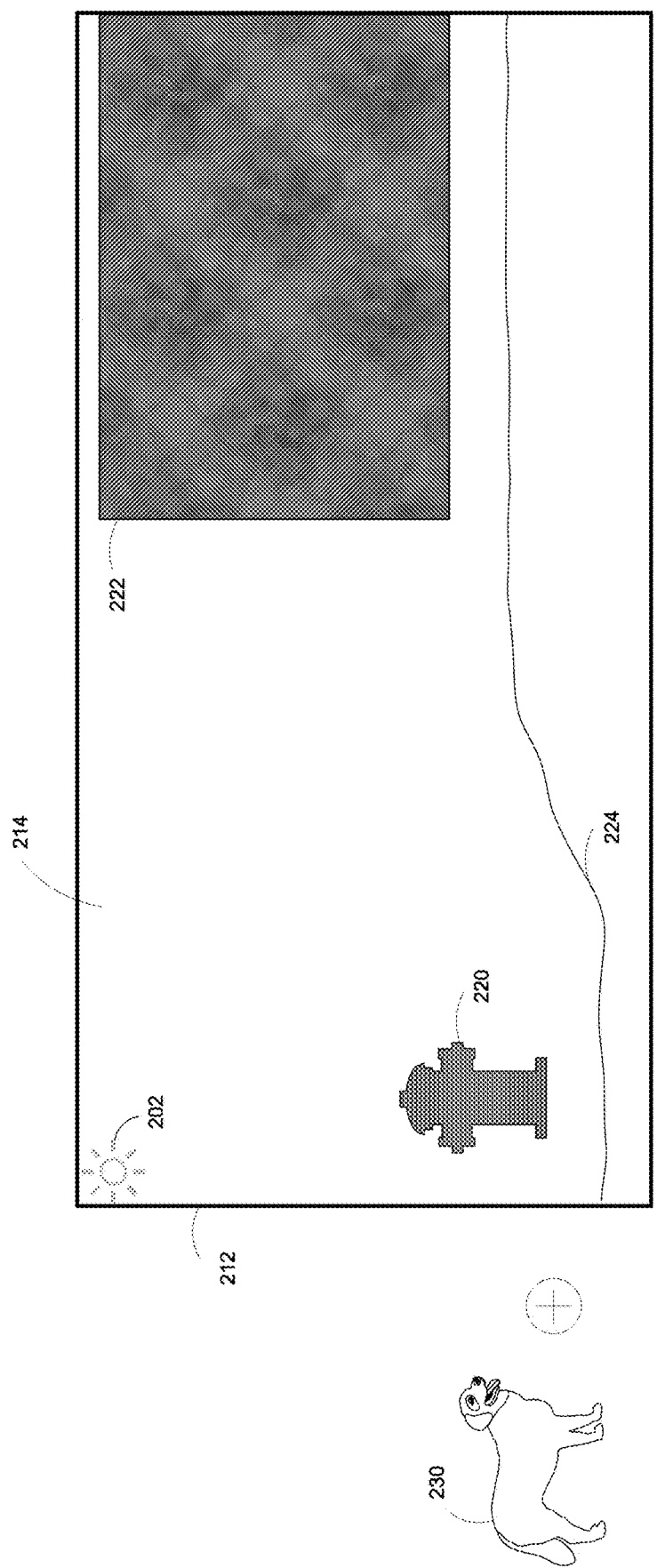

As illustrated in FIG. 2C, the electronic device 212 is adding a CGR dog 230 to the translucent display 214, as indicated by the plus sign, which is illustrated for purely illustrative purposes. The CGR dog 230 is white in color. In other words, the electronic device 212 renders the CGR dog 230 as white and thus the preferred display color of the CGR dog 230 once added to the translucent display 214 is likewise white.

Figure 2D:
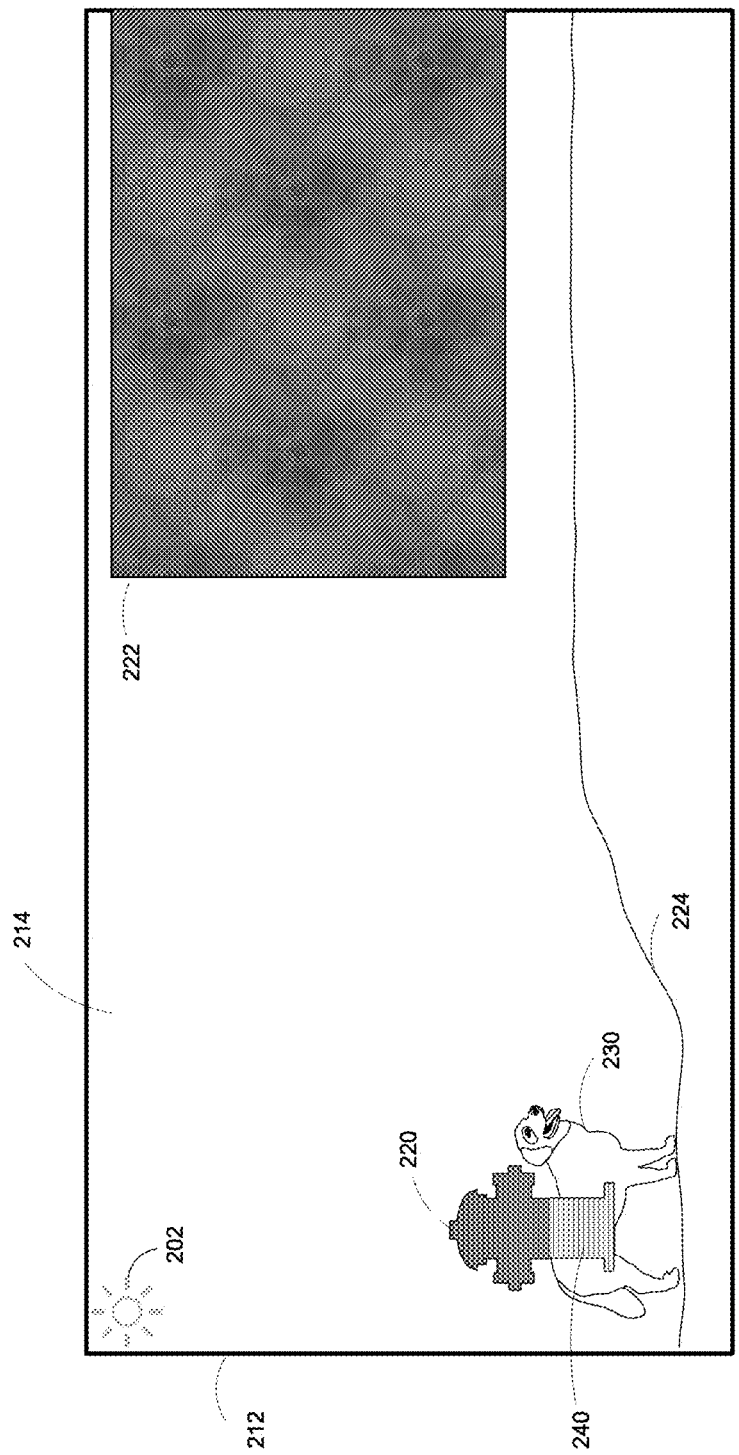

As illustrated in FIG. 2D, the electronic device 212 adds the CGR dog 230 to the translucent display 214. Namely, the CGR dog 230 is added to (e.g., overlaid on) a portion of the translucent display 214 that includes the red fire hydrant 220. However, as illustrated in FIG. 2D, the light reflecting off of the red fire hydrant 220 interferes with display of the CGR dog 230. Namely, the red fire hydrant 220 overlaps with a first portion 240 of the CGR dog 230. Accordingly, the red color of the red fire hydrant 220 mixes with the white color of the first portion 240 of the CGR dog 230, causing the first portion 240 of the CGR dog 230 to be pink in color rather than the preferred white color of the rest of the CGR dog 230.

Figure 2E:
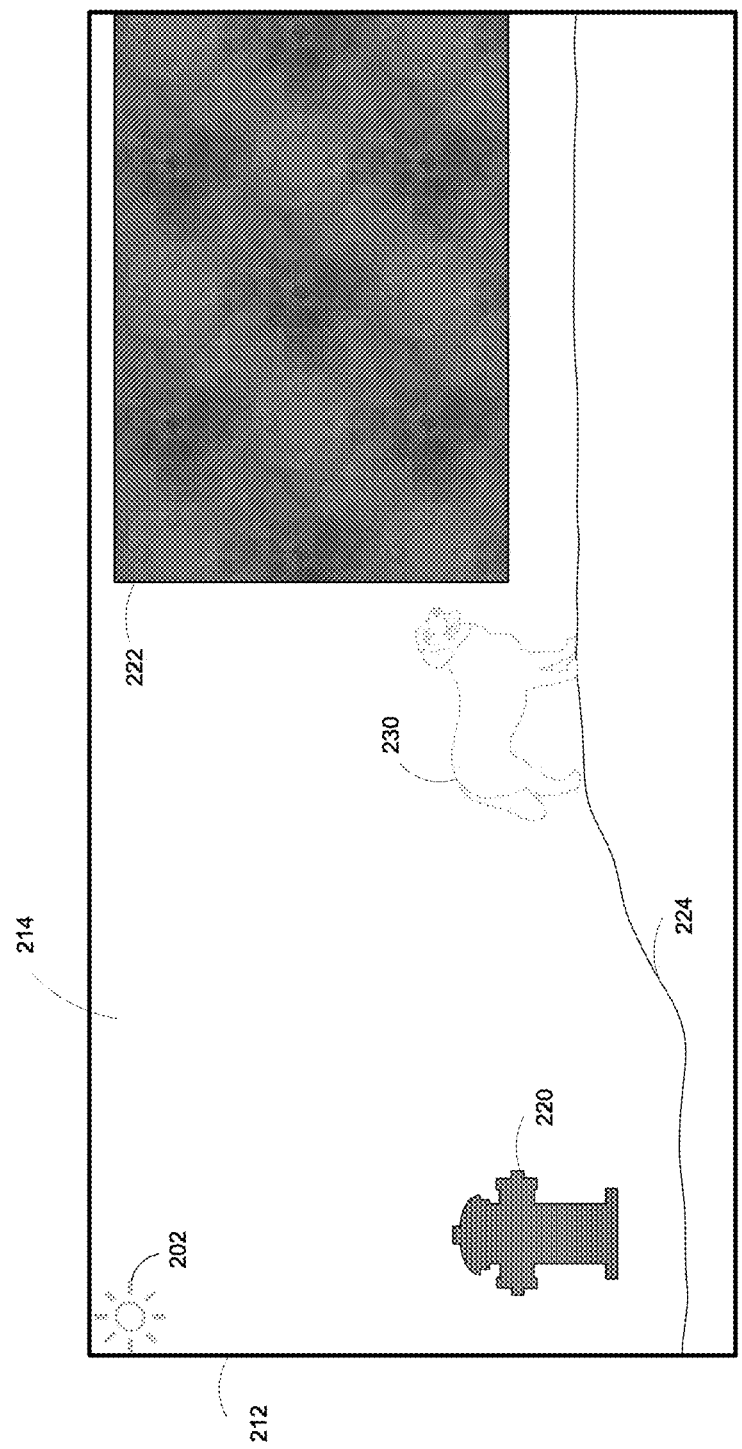

As illustrated in FIG. 2E, the electronic device 212 has moved the CGR dog 230 along the path 224 towards the blue wall 222. The light emanating from the Sun 202 is more intense (e.g., more luminate) than lighting features of the CGR dog 230. Accordingly, the Sun 202 drowns out the lighting features of the CGR dog 230, resulting in a low brightness contrast between the Sun 202 and the CGR dog 230, which, in turn, results in a faded CGR dog 230 in FIG. 2E.

Figure 2F:
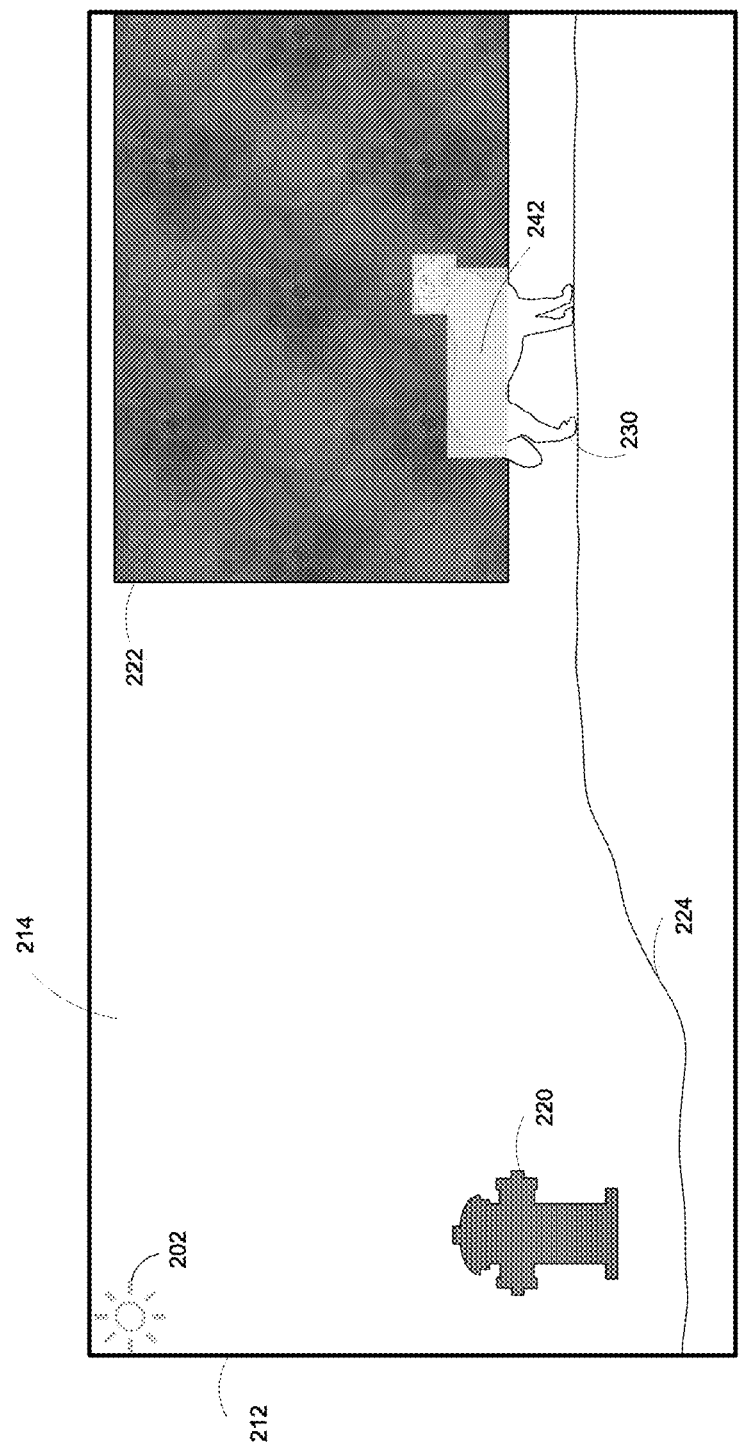

As illustrated in FIG. 2F, the electronic device 212 has moved the CGR dog 230 to a portion of the translucent display 214 that includes the blue wall 222. However, as illustrated in FIG. 2F, the light reflecting off of the blue wall 222 interferes with display of the CGR dog 230. Namely, the blue wall 222 overlaps with a second portion 242 of the CGR dog 230, as indicated by a lighter cross-hatch pattern within the second portion 242 (as compared with the cross-hatch pattern of the blue wall 222). Accordingly, the blue color of the blue wall 222 mixes with the white color of the second portion 242 of the CGR dog 230, causing the second portion 242 of the CGR dog 230 to be light blue rather than the preferred white color of the remainder of the CGR dog 230.

Figure 2G:
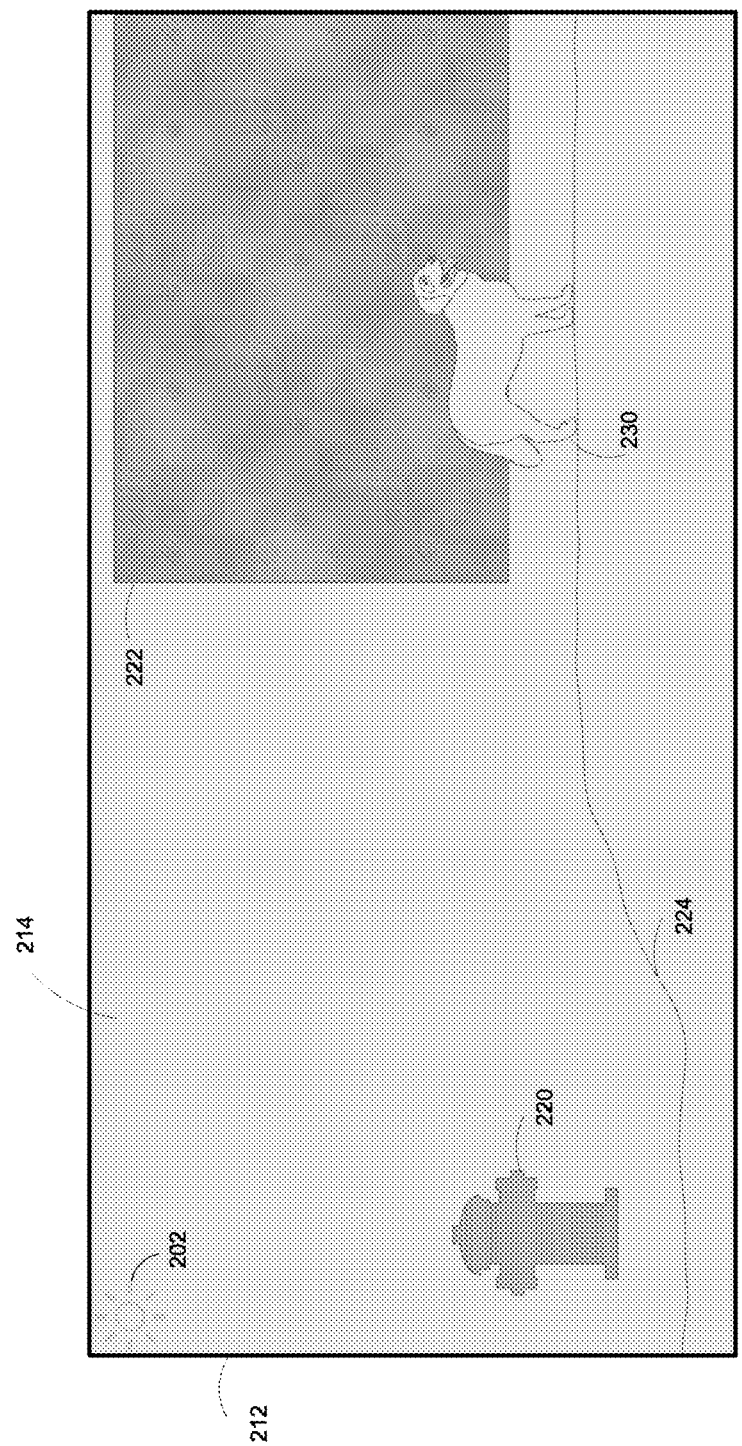

As illustrated in FIG. 2G, in some circumstances, the electronic device 212 provides (e.g., overlays) a physical fixed dimming layer onto the translucent display 214 in order to block a certain amount light from passing through to the translucent display 214 from the physical environment 200. However, this mechanism is problematic because, as a result, the translucent display 214 displays a constantly darker version of the physical environment 200, thereby degrading the user's experience, and preventing use of such systems in low light situations.

Figure 3A:
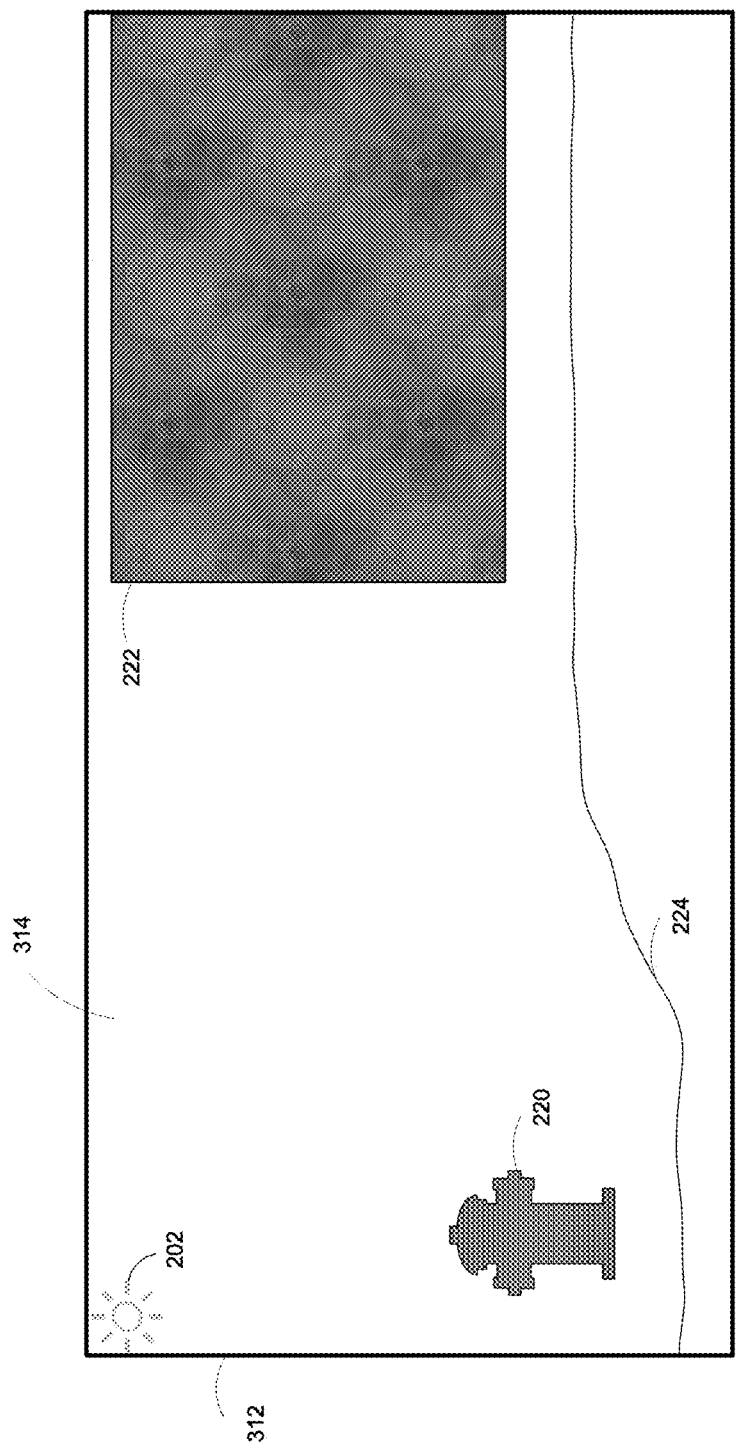
FIGS. 3A-3C are an example of an electronic device that changes display operating parameters based on determined display correction values in accordance with some implementations.
Figure 3B:
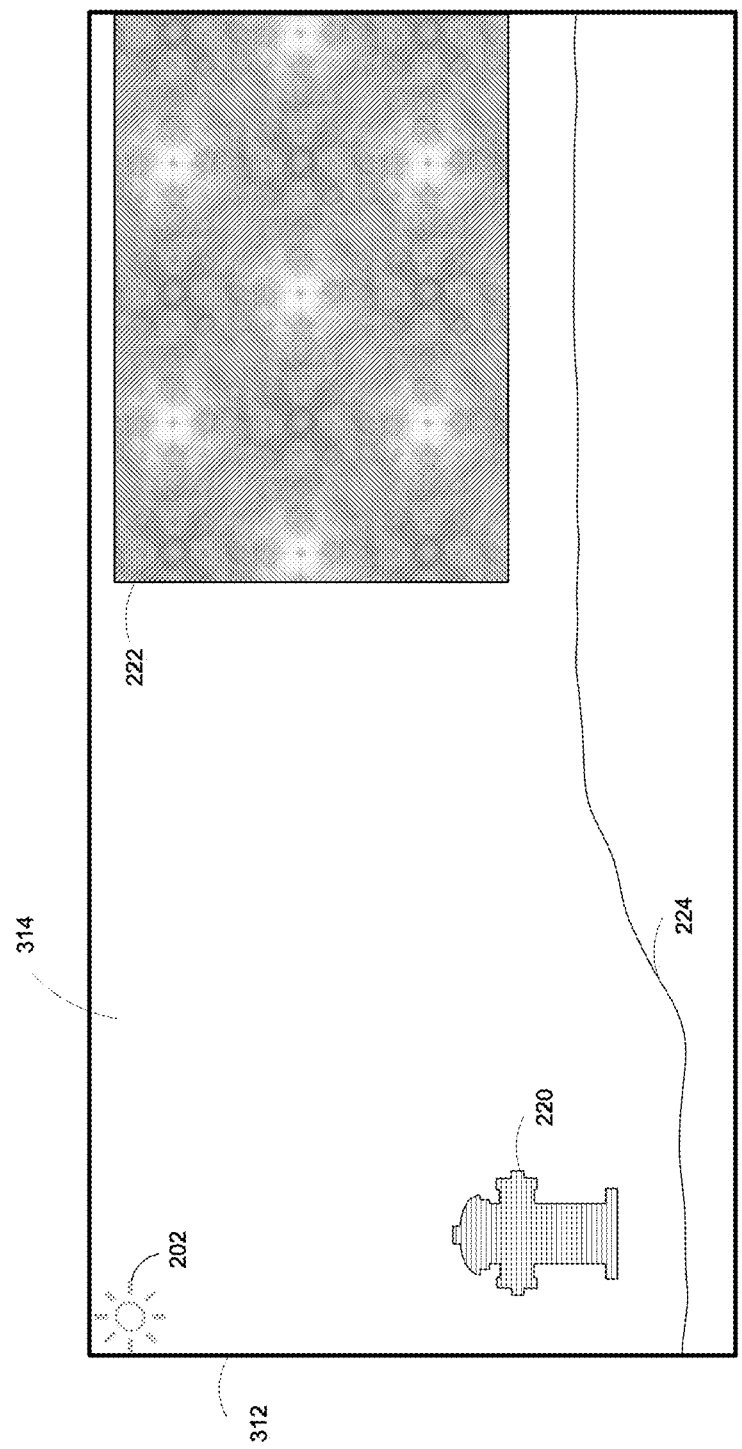
Figure 3C:
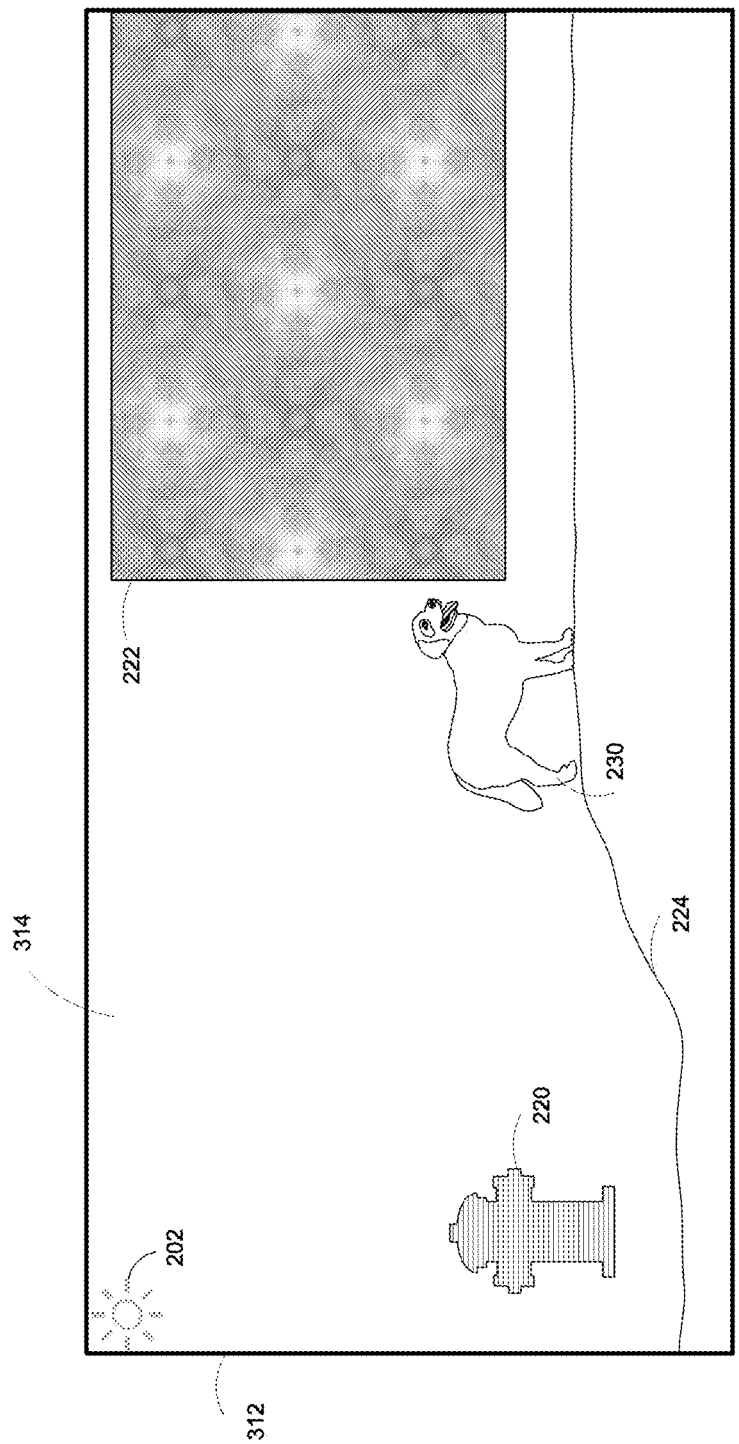

FIGS. 3A-3C are an example of an electronic device 312 that changes display operating parameters based on determined display correction values in accordance with some implementations. In some implementations, the electronic device 312 corresponds to a mobile device, such as a smartphone, tablet, media player, laptop, etc. In some implementations, the electronic device 312 corresponds to a head-mountable device (HMD) that includes an integrated display (e.g., a built-in display). In some implementations, the HMD includes a head-mountable enclosure. In various implementations, the head-mountable enclosure includes an attachment region to which another device with a translucent display can be attached. In various implementations, the head-mountable enclosure is shaped to form a receptacle for receiving another device that includes a translucent display 314. For example, in some implementations, the electronic device 312 slides/snaps into or otherwise attaches to the head-mountable enclosure. In some implementations, the translucent display 314 of the device attached to the head-mountable enclosure presents (e.g., displays) the plurality of sequential images. For example, in some implementations, the electronic device 312 corresponds to a mobile phone that can be attached to the head-mountable enclosure.

In some implementations, the electronic device 312 corresponds to an HMD that operates as an additive display by adding CGR to the light from the user's physical environment. For example, in some implementations, the HMD operates as an additive display by projecting CGR content to be reflected off of the translucent display 314. As another example, in some implementations, the HMD operates as an additive display by displaying CGR content onto an emissive display to the user's eyes. As yet another example, in some implementations, the HMD operates as an additive display by emitting light towards the translucent display 314, such as via a waveguide. As yet another example, in some implementations, the HMD operates as an additive display by projecting CGR content directly at the user's retinas, where pass-through light from the physical environment and the projected light of the CGR content concurrently reach the retinas.

In some implementations, the translucent display 314 corresponds to glasses with optical see-through. In some implementations, the translucent display 314 is made of a translucent material (e.g., glass or plastic). In some implementations, the translucent display 314 corresponds to an additive display that enables optical see-through of the physical environment, such as an optical HMD (OHMD). For example, in contrast to pure compositing using a video stream, the additive display is capable of reflecting projected images off of the display while enabling the user to see through the display. In some implementations, the translucent display 314 displays at least a nominal amount of light from the physical environment. In some implementations, the translucent display 314 includes a photochromic lens or an electrochromic layer. In some implementations, the HMD operates as an additive display by projecting AR content to be reflected off of the translucent display to the user's eyes; or, directly at the user's retinas, where pass-through light from the physical environment and the projected light of the AR content concurrently reach the retinas. The HMD adds computer-generated content to a user's physical environment.

As illustrated in FIG. 3A, the translucent display 314 includes the Sun 202, the red fire hydrant 220, the path 224, and the blue wall 222, which were discussed above with reference to FIGS. 2A-2G. In order to improve the lack of contrast between the CGR dog 230 and light emanating from the Sun 202 illustrated in FIG. 2E, the electronic device 312 globally tints the translucent display 314 in some implementations. Accordingly, as illustrated in FIG. 3B, the translucent display 314 includes the red fire hydrant 220 with a lighter red hue (as indicated by a lighter shade of the horizontal pattern) and the blue wall 222 with a lighter blue hue (as indicated by a lighter shade of the cross-hatch pattern) as compared with the corresponding physical objects in FIG. 2B. As a result of the tinting, as illustrated in FIG. 3C, the CGR dog 230 and the light emanating from the Sun 202 have a greater amount of contrast with respect to each other, and thus the CGR dog 230 is more visible (e.g., less faded out) as compared with the CGR dog 230 in FIG. 2E. As another example, in some implementations, instead of or in addition to tinting the translucent display 314, the electronic device 312 increases the luminance value of the CGR dog 230 in order to establish an adequate level of contrast between the CGR dog 230 and the light emanating from the Sun 202. For example, the electronic device 312 renders the CGR dog 230 with a higher luminance white than it otherwise would in order to compensate for the brightness of the Sun 202.

FIGS. 4A-4D are another example of an electronic device 412 that changes display operating parameters based on determined display correction values in accordance with some implementations. According to various implementations, the electronic device 412 is similar to the electronic device 312 described above with reference to FIGS. 3A-3C. The electronic device 412 includes a translucent display 414. According to various implementations, the translucent display 414 is similar to the translucent display 314 described above with reference to FIGS. 3A-3C.

Figure 4A:
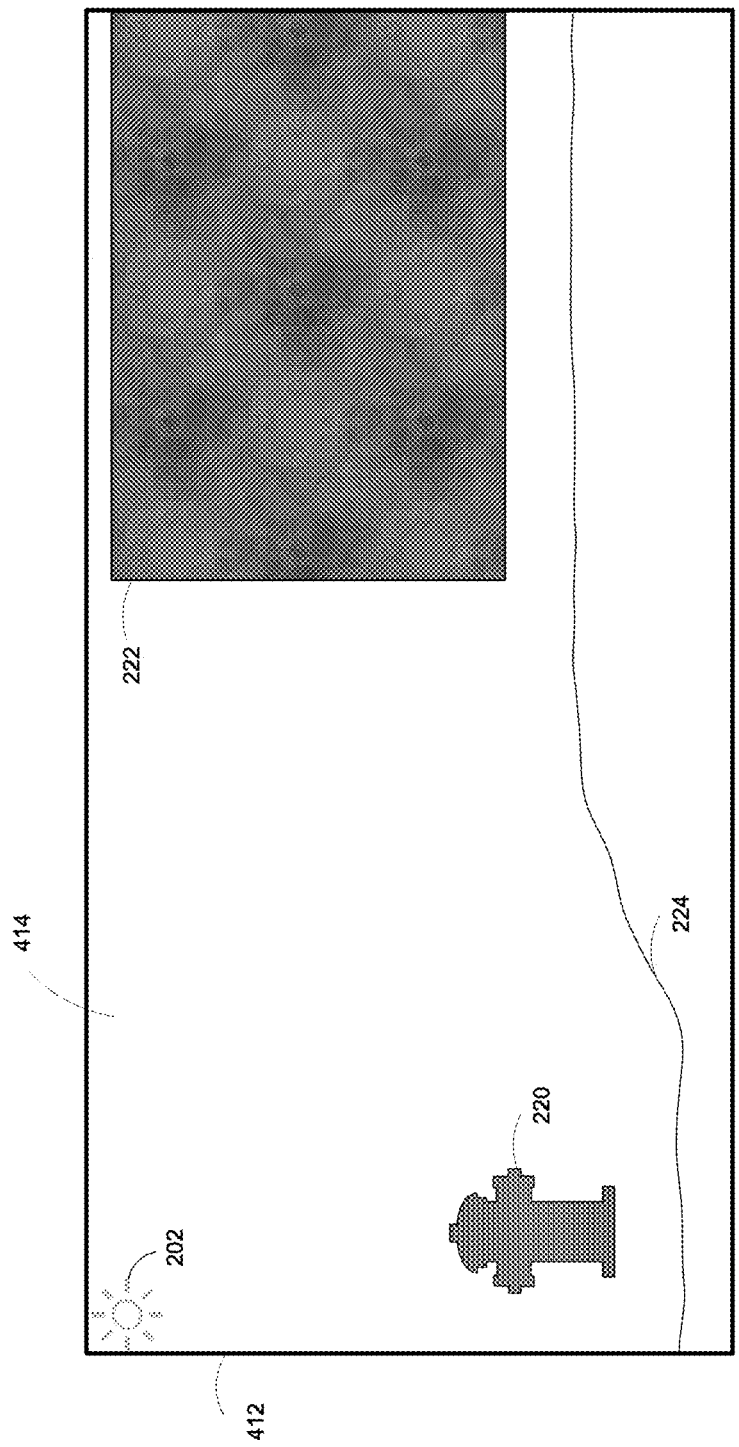
FIGS. 4A-4D are another example of an electronic device that changes display operating parameters based on determined display correction values in accordance with some implementations.
Figure 4B:
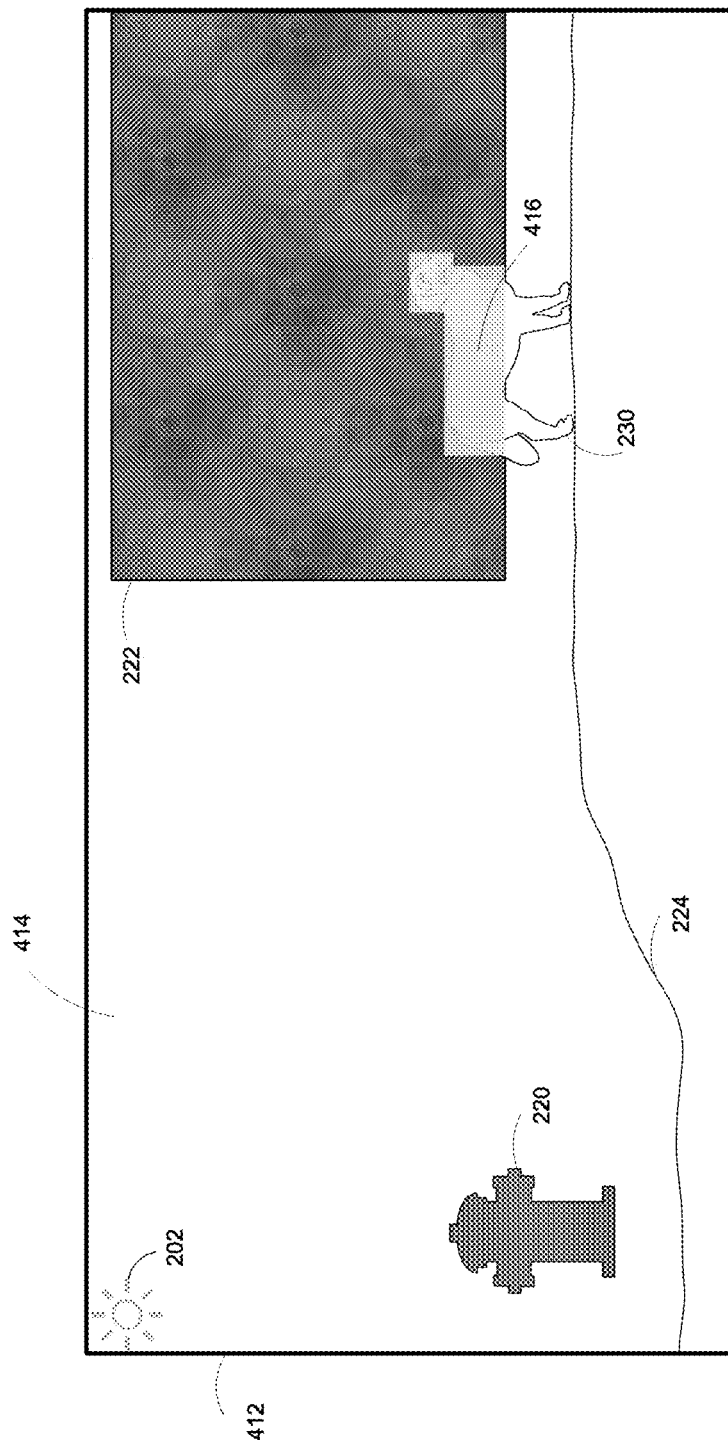

As illustrated in FIG. 4A, the translucent display 414 includes the Sun 202, the red fire hydrant 220, the path 224, and the blue wall 222. As illustrated in FIG. 4B, the electronic device 412 adds the CGR dog 230 to a portion 416 of the translucent display 414 and in front of a corresponding portion of the blue wall 222. As a result, the blue light reflecting off of the blue wall 222 undesirably mixes with the CGR dog 230. Accordingly, a portion of the CGR dog 230 is distorted by the blue light. In order to reduce the undesirable color mixing between the blue wall 222 and the CGR dog 230, the electronic device 412 modifies the display operating parameters. In some implementations, the electronic device 412 modifies the display operating parameters before adding the CGR dog 230 to the translucent display 414.

Figure 4C:
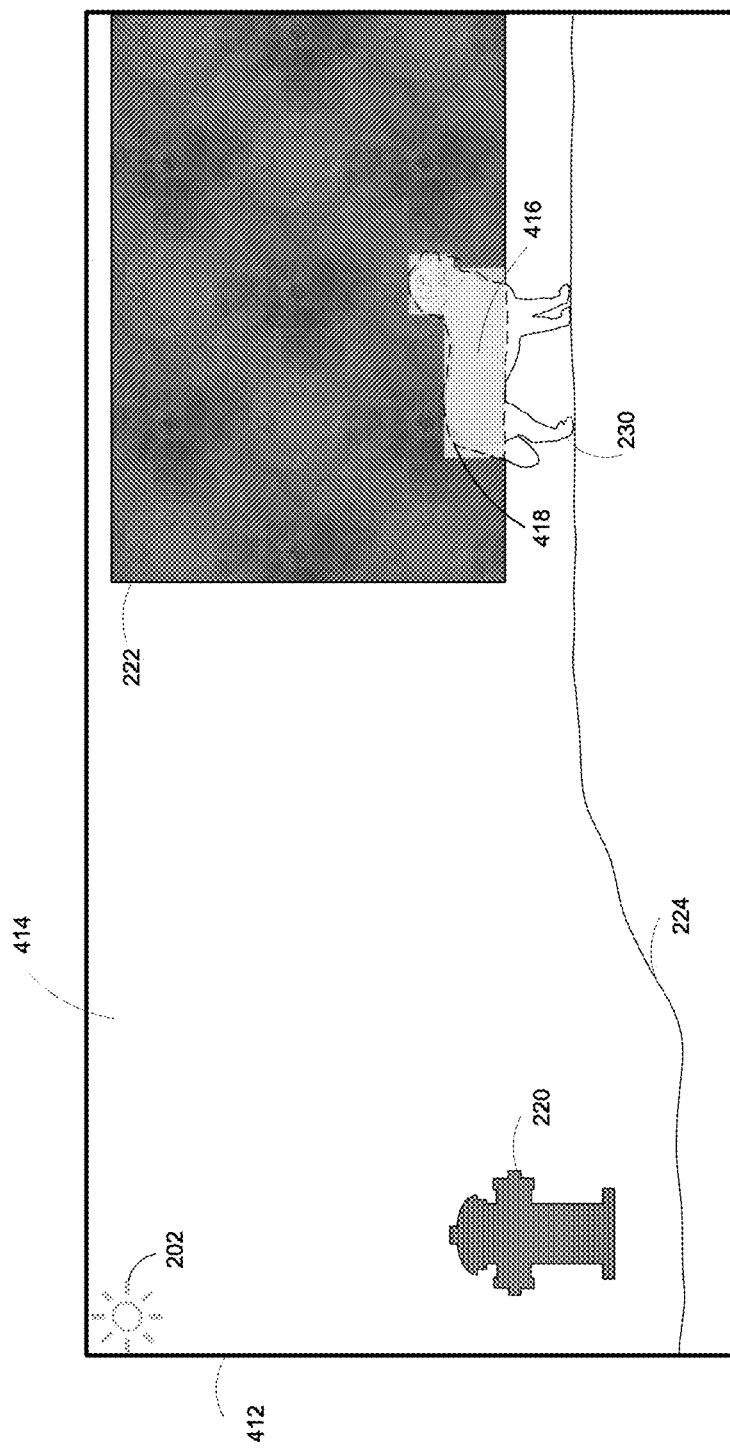
Figure 4D:
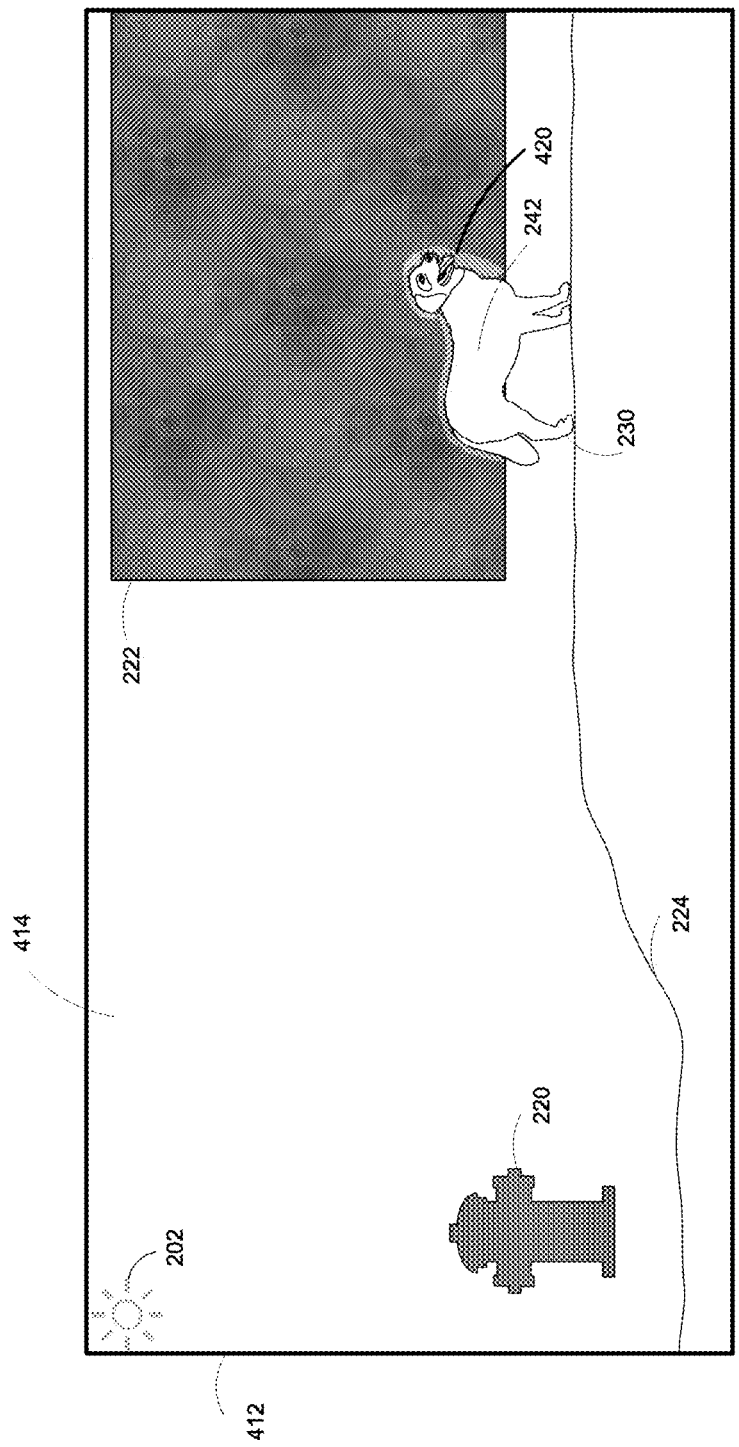

To that end, as illustrated in FIG. 4C, the electronic device 312 identifies an area 418 of the translucent display 414 on which modify the display operating parameters. For example, in some implementations, the electronic device 412 modifies color compositions of respective portions of the CGR dog 230 and/or the blue wall 222. As one example, before adding the CGR dog 230 to the translucent display 414, the electronic device 412 renders a portion of the CGR dog 230, that corresponds to the area 418, with a color that is opposite to the blue color of the blue wall 222. Thus, once the electronic device 412 adds the CGR dog 230 to the translucent display 414, the CGR dog 230 appears to be the desired white color, as illustrated in FIG. 4D. Note that in FIG. 4D an artifact 420 may appear resulting from the modified rendering of the CGR dog 230. As another example, in some implementations, instead of or in addition to modifying color compositions, the electronic device 412 tints the area 418 (e.g., performs local tinting), such as reducing the luminance of the portion of the blue wall 222 corresponding to the area 418. Accordingly, as illustrated in FIG. 4D, the CGR dog 230 added to the translucent display 414 appears to be desired white color because the magnitude of the blue light reflecting off of the blue wall 222 is reduced.

Figure 5:
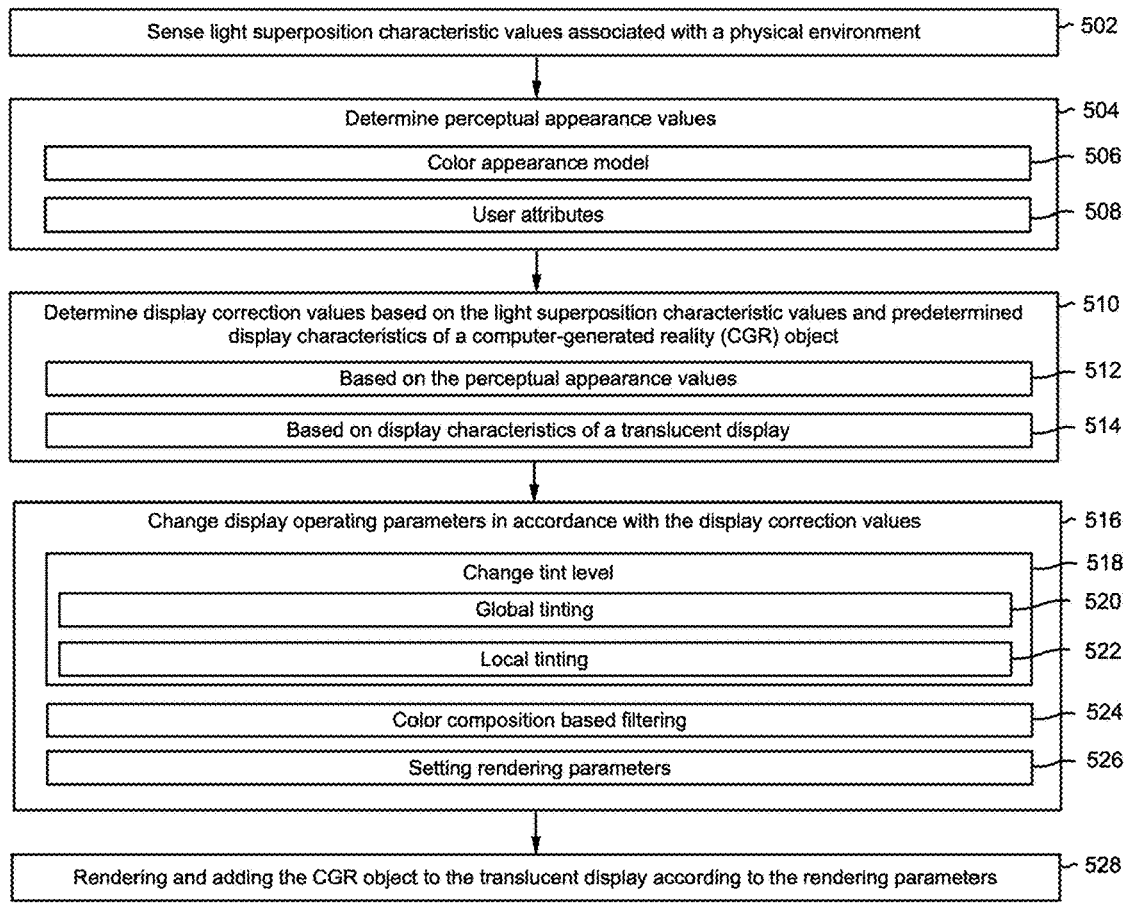
FIG. 5 is an example of a flow diagram of a method of changing display operating parameters based on determined display correction values in accordance with some implementations.

FIG. 5 is an example of a flow diagram of a method 500 of changing display operating parameters based on determined display correction values in accordance with some implementations. In various implementations, the method 500 or portions thereof are performed by an electronic device (e.g., the electronic device 100 in FIG. 1, the electronic device 312 in FIGS. 3A-3C, or the electronic device 412 in FIGS. 4A-4D). In various implementations, the method 500 or portions thereof are performed by a head-mountable device (HMD) including a translucent display. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 502, the method 500 includes sensing a plurality of light superposition characteristic values associated with ambient light from a physical environment. The ambient light emanates from the physical environment towards one side of the translucent display. The plurality of light superposition characteristic values quantifies interactions with the ambient light. In some implementations, the plurality of light superposition characteristic values includes a combination of color values (e.g., hue value and saturation value) of the physical environment and brightness values (e.g., luminance value and intensity value)

of the physical environment. For example, in some implementations, the plurality of light superposition characteristic values indicates background lighting values and foreground lighting values that characterize the physical environment. In some implementations, sensing the plurality of light superposition characteristic values includes determining the plurality of light superposition characteristic values. For example, an environmental sensor (e.g., a light sensor) integrated in an electronic device detects lighting attributes of the physical environment (e.g., intensity of light, color of light), and the electronic device determines the plurality of light superposition characteristic values based on the lighting attributes.

As represented by block 504, in some implementations, the method 500 includes determining perceptual appearance values that characterize how the plurality of light superposition characteristic values are perceived. In some implementations, as represented by block 506, the perceptual appearance values are based on a color appearance model. For example, the color appearance model provides perceptual aspects of human color vision, such as the extent to which viewing conditions of a color diverge from the corresponding physical measurement of a stimulus source. In some implementations, as represented by block 508, the perceptual appearance values are based on user attributes. In a variety of implementations, the user attributes include a combination of pupil dilation of a user, how long the user has been in the physical environment, where the user is located within the physical environment, eye gaze (e.g., eye focus) of the user and duration of the eye gaze at a particular location within the physical environment, and/or the like. For example, in some implementations, the method 500 includes obtaining, via an eye tracking sensor integrated in an HMD, eye tracking data indicative of an eye gaze location of a user, wherein determining the plurality of perceptual appearance values is based on the eye gaze location.

As represented by block 510, the method 500 includes determining a plurality of display correction values associated with the electronic device based on a function of the plurality of light superposition characteristic values and predetermined (e.g., preferred) display characteristics of a computer-generated reality (CGR) object. For example, the predetermined display characteristics include a predetermined color of the CGR object, such as white for a CGR ghost. As another example, the predetermined display characteristics include a predetermined luminance value of the CGR object, such as relatively bright intensity level for a CGR star. As represented by block 512, in some implementations, the plurality of display correction values is also a function of the perceptual appearance values described above with reference to blocks 504-508. As represented by block 514, in some implementations, the plurality of display correction values is also a function of display characteristics of a translucent display of an electronic device. For example, the display characteristics include lens characteristics, such as a combination of a translucency level of the lens, lens shape and dimensions, lens tint (e.g., frosting) level, distance between the lens and user's eyes, and/or the like.

As represented by block 516, the method 500 includes changing one or more display operating parameters associated with the electronic device in accordance with the plurality of display correction values in order to satisfy the predetermined display characteristics of the CGR object within a performance threshold. For example, the performance threshold corresponds to an error threshold, such as an error margin.

As represented by block 518, in some implementations, changing the one or more display operating parameters includes changing a tint level associated with the translucent display in order to satisfy the predetermined display characteristics of the CGR object within the performance threshold. For example, changing the tint level include dimming the translucent display. As another example, the magnitude of the tint level is relative to the brightness level of the physical environment. As yet another example, the magnitude of the tint level is based on a predetermined brightness characteristic of the CGR object. As represented by block 520, in some implementations, changing the tint level of the translucent display includes globally tinting the translucent display. For example, globally tinting the translucent display corresponds to tinting the entirety of the translucent display according to the tint level. As another example, globally tinting the translucent display includes reducing the light transmission, either evenly over the whole spectrum or unevenly, which may, in turn, lead to color shifts. As represented by block 522, in some implementations, changing the tint level of the translucent display includes tinting a portion of the translucent display that is less than the entirety of the translucent display, such as local dimming. For example, in some implementations, the portion of the translucent display corresponds to a location on the translucent display where the CGR object is to be added. As one example, the location is proximate to or at least partially overlaps with the CGR object.

In some implementations, the electronic device includes multiple tinting layers (e.g., 10% opacity, 25% opacity, 75% opacity). The tinting layers may be implemented in hardware or in software. According to various implementations, the electronic device applies the tinting layers to a portion of or the entirety of the translucent display in order to provide the desired tinting.

As represented by block 524, in some implementations, changing the one or more display operating parameters includes changing a color composition associated with the translucent display in order to satisfy the predetermined display characteristics of the CGR object within the performance threshold. For example, if the physical environment emits predominately green light and the CGR object is white, the method 500 includes filtering out a portion (e.g., local filtering) of green light emitted onto the translucent display that is located near to where the CGR object is to be displayed. As another example, in some implementations, changing the color composition associated with the translucent display includes adding colors to the translucent display as a function of the ambient light that emanates from the physical environment. For example, the method 500 includes adding colors in order to compensate for or offset the ambient light from the physical environment. As one example, if the CGR object is a white ghost and the physical environment includes green trees, the method 500 includes adding purple light, the opposite color of green, in order to display the CGR ghost as white on the translucent display.

In some implementations, the method 500 includes changing the color composition with respect to a particular portion of the translucent display, such as at or near where the CGR object to be displayed (e.g., local color composition filtering). In some implementations, the method 500 includes changing the color composition with respect to the entirety of the translucent display (e.g., global color composition filtering). For example, when the CGR object is a white ghost, an electronic device adds purple light across the entire translucent display in order to counter predominately green light (the opposite of purple light) from the physical environment.

In some implementations, the electronic device includes multiple color composition filtering layers (e.g., a red filter layer, a green filter layer, and a blue filter layer). The color composition filtering layers may be implemented in hardware or in software. According to various implementations, the electronic device applies the color composition filtering layers to a portion of or the entirety of the translucent display in order to provide the desired filtering.

As represented by block 526, in some implementations, changing the one or more display operating parameters includes setting rendering parameters for the CGR object in order to satisfy the predetermined display characteristics of the CGR object within the performance threshold. In some implementations, changing the one or more display operating parameters includes jointly changing a tint level (e.g., as described above with reference to blocks 518-522) of the translucent display and setting the rendering parameters for the CGR object in order to satisfy the predetermined display characteristics of the CGR object within the performance threshold. For example, the method 500 includes concurrently changing the tint level and setting the rendering parameters. In some implementations, setting the rendering parameters for the CGR object is in accordance with a determination that the CGR object and the plurality of light superposition characteristic values collectively satisfy one or more contrast criteria (e.g., a contrast threshold). For example, in some implementations, the one or more contrast criteria include a luminance contrast criterion. As one example, if the physical environment is dim and the predetermined display characteristic of a CGR object indicates that the CGR object is likewise dim, then the electronic device sets the rendering parameters in order to render the CGR object with more brightness in order to product a greater luminance contrast between the CGR object and the physical environment. As another example, in some implementations, the one or more contrast criteria include a color contrast criterion, such as a white point metric or neutral color metric. As one example, if the physical environment is predominately one color (e.g., green trees), then the electronic device sets the rendering parameters in order to render the CGR object with an opposite color (e.g., purple).

As represented by block 528, in some implementations, the method 500 includes rendering the CGR object according to the rendering parameters and adding the CGR object to the translucent display. For example, adding to the CGR object to the translucent display includes projecting the CGR object off of the translucent display while enabling the user to see through the translucent display.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device including one or more processors, a non-transitory memory, and a translucent display:
sensing a plurality of light superposition characteristic values associated with ambient light from a physical environment, wherein the ambient light emanates from the physical environment towards one side of the translucent display, and wherein the plurality of light superposition characteristic values quantifies interactions with the ambient light;
determining a plurality of display correction values associated with the electronic device based on a function of the plurality of light superposition characteristic values and predetermined display characteristics of a computer-generated reality (CGR) object; and
changing one or more display operating parameters associated with the electronic device in accordance with the plurality of display correction values in order to satisfy the predetermined display characteristics of the CGR object within a performance threshold.

2. The method of claim 1, wherein changing the one or more display operating parameters includes changing a tint level associated with the translucent display in order to satisfy the predetermined display characteristics of the CGR object within the performance threshold.

3. The method of claim 2, wherein changing the tint level of the translucent display includes globally tinting the translucent display.

4. The method of claim 2, wherein changing the tint level of the translucent display includes tinting a portion of the translucent display that is less than the entirety of the translucent display.

5. The method of claim 4, wherein the portion of the translucent display corresponds to a location on the translucent display where the CGR object is to be displayed.

6. The method of claim 1, wherein changing the one or more display operating parameters includes changing a color composition associated with the translucent display in order to satisfy the predetermined display characteristics of the CGR object within the performance threshold.

7. The method of claim 6, wherein changing the color composition associated with the translucent display includes adding colors to the translucent display as a function of the ambient light that emanates from the physical environment.

8. The method of claim 1, wherein changing the one or more display operating parameters includes setting rendering parameters for the CGR object in order to satisfy the predetermined display characteristics of the CGR object within the performance threshold.

9. The method of claim 8, wherein setting the rendering parameters for the CGR object is in accordance with a determination that the CGR object and the plurality of light superposition characteristic values collectively satisfy one or more contrast criteria.

10. The method of claim 9, wherein the one or more contrast criteria include a luminance contrast criterion.

11. The method of claim 9, wherein the one or more contrast criteria include a color contrast criterion.

12. The method of claim 8, further comprising:
rendering the CGR object according to the rendering parameters; and
adding the CGR object to the translucent display.

13. The method of claim 1, wherein changing the one or more display operating parameters includes jointly changing a tint level of the translucent display and setting rendering parameters for the CGR object in order to satisfy the predetermined display characteristics of the CGR object within the performance threshold.

14. The method of claim 1, wherein the plurality of display correction values is further a function of display characteristics of the translucent display.

15. The method of claim 1, further comprising determining perceptual appearance values that characterize how the plurality of light superposition characteristic values are perceived, wherein determining the plurality of display correction values is further a function of the perceptual appearance values.

16. The method of claim 15, wherein the perceptual appearance values are based on a color appearance model.

17. The method of claim 15, wherein the perceptual appearance values are based on user attributes.

18. The method of claim 1, wherein the predetermined display characteristics include a predetermined color of the CGR object.

19. An electronic device comprising:
one or more processors;
a non-transitory memory;
a translucent display; and
one or more programs, wherein the one or more programs are stored in the non-transitory memory and configured to be executed by the one or more processors, the one or more programs including instructions for:
sensing a plurality of light superposition characteristic values associated with ambient light from a physical environment, wherein the ambient light emanates from the physical environment towards one side of the translucent display, and wherein the plurality of light superposition characteristic values quantifies interactions with the ambient light;
determining a plurality of display correction values associated with the electronic device based on a function of the plurality of light superposition characteristic values and predetermined display characteristics of a computer-generated reality (CGR) object; and
changing one or more display operating parameters associated with the electronic device in accordance with the plurality of display correction values in order to satisfy the predetermined display characteristics of the CGR object within a performance threshold.

20. The electronic device of claim 19, wherein the predetermined display characteristics include a predetermined luminance value of the CGR object.

21. The electronic device of claim 19, wherein changing the one or more display operating parameters includes one or more of:
changing a tint level associated with the translucent display in order to satisfy the predetermined display characteristics of the CGR object within the performance threshold, or changing a color composition associated with the translucent display in order to satisfy the predetermined display characteristics of the CGR object within the performance threshold.

22. The electronic device of claim 21, wherein changing the tint level of the translucent display includes globally tinting the translucent display.

23. The electronic device of claim 21, wherein changing the tint level of the translucent display includes tinting a portion of the translucent display that is less than the entirety of the translucent display.

24. A non-transitory computer readable storage medium storing one or more programs, the one or more programs comprising instructions, which, when executed by an electronic device with one or more processors and a translucent display, cause the electronic device to:
  sense a plurality of light superposition characteristic values associated with ambient light from a physical environment, wherein the ambient light emanates from the physical environment towards one side of the translucent display, and wherein the plurality of light superposition characteristic values quantifies interactions with the ambient light;
  determine a plurality of display correction values associated with the electronic device based on a function of the plurality of light superposition characteristic values and predetermined display characteristics of a computer-generated reality (CGR) object; and
  change one or more display operating parameters associated with the electronic device in accordance with the plurality of display correction values in order to satisfy the predetermined display characteristics of the CGR object within a performance threshold.

25. The non-transitory computer readable storage medium of claim 24, wherein changing the one or more display operating parameters includes one or more of:
  changing a tint level associated with the translucent display in order to satisfy the predetermined display characteristics of the CGR object within the performance threshold, or
  changing a color composition associated with the translucent display in order to satisfy the predetermined display characteristics of the CGR object within the performance threshold.

26. The non-transitory computer readable storage medium of claim 24, wherein changing the one or more display operating parameters includes setting rendering parameters for the CGR object in order to satisfy the predetermined display characteristics of the CGR object within the performance threshold.

27. The non-transitory computer readable storage medium of claim 24, wherein changing the one or more display operating parameters includes jointly changing a tint level of the translucent display and setting rendering parameters for the CGR object in order to satisfy the predetermined display characteristics of the CGR object within the performance threshold.

28. The non-transitory computer readable storage medium of claim 24, wherein the predetermined display characteristics includes a predetermined brightness characteristic of the CGR object.

29. The non-transitory computer readable storage medium of claim 24, wherein the predetermined display characteristics indicate a dimness level of the CGR object.

* * * * *